United States Patent
Thottethodi et al.

(10) Patent No.: US 9,626,428 B2
(45) Date of Patent: Apr. 18, 2017

(54) APPARATUS AND METHOD FOR HASH TABLE ACCESS

(71) Applicant: Advanced Micro Devices, Inc., Sunnyvale, CA (US)

(72) Inventors: Mithuna Thottethodi, Bellevue, WA (US); Steven Reinhardt, Vancouver, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 624 days.

(21) Appl. No.: 14/024,139

(22) Filed: Sep. 11, 2013

(65) Prior Publication Data
US 2015/0074372 A1    Mar. 12, 2015

(51) Int. Cl.
*G06F 12/10* (2016.01)
*G06F 17/30* (2006.01)

(52) U.S. Cl.
CPC .............. *G06F 17/30628* (2013.01)

(58) Field of Classification Search
None
See application file for complete search history.

(56) References Cited

U.S. PATENT DOCUMENTS

| | | | |
|---|---|---|---|
| 8,515,965 B2 * | 8/2013 | Mital | G06F 15/167 707/747 |
| 2014/0333635 A1 * | 11/2014 | Demouth | G06T 1/20 345/505 |

* cited by examiner

*Primary Examiner* — Cheng-Yuan Tseng
(74) *Attorney, Agent, or Firm* — Volpe and Koenig, P.C.

(57) ABSTRACT

A system and method for accessing a hash table are provided. A hash table includes buckets where each bucket includes multiple chains. When a single instruction multiple data (SIMD) processor receives a group of threads configured to execute a key look-up instruction that accesses an element in the hash table, the threads executing on the SIMD processor identify a bucket that stores a key in the key look-up instruction. Once identified, the threads in the group traverse the multiple chains in the bucket, such that the elements at a chain level in the multiple chains are traversed in parallel. The traversal continues until a key look-up succeeds or fails.

16 Claims, 5 Drawing Sheets

APPARATUS AND METHOD FOR HASH TABLE ACCESS

BACKGROUND

Field

Embodiments of the present disclosure are generally directed to hash tables, and more specifically to accessing hash tables using parallel processors.

Background Art

Hash tables are data structures that store elements. To store, manipulate and retrieve elements (i.e., operations that must be supported in any dynamic set data structure), hash tables utilize operations such as insert, search and delete.

In conventional hash tables, element manipulation is efficient when performed on sequential processors, such as conventional control processing units ("CPUs"), but is inefficient when performed on parallelized processors, such as general purpose graphics processing units ("GPGPUs"). The inefficiency stems from a lack of parallelism in hash table operations, and from branch and memory divergence associated with the element storage.

In a GPGPU, multiple threads may be combined into groups provided the threads in a group execute the same set of instructions as the other threads in the group in parallel. When threads receive key look-up instructions to look up elements in a hash table, threads access the hash table in parallel to look-up keys associated with each element. However, because each key is different, the associated element of the hash table is located at a different depth in the hash table. This causes each thread to complete its key look-up at a different time. Because such threads in a group execute the same set of instructions, the threads that have successfully completed the key look-up instruction continue to execute false look-up instructions (the effects of which are "masked" and are prevented from being made permanent) as they wait for the remaining threads to complete. This leads to branch divergence and reduced thread efficiency on a parallel processor.

Therefore, what is needed is a hash table that enhances parallelism and reduces branch and memory divergence for operations on dynamic-set data structures processed by a GPGPU.

BRIEF SUMMARY OF EMBODIMENTS

A system and method for accessing a hash table are provided. A hash table includes buckets where each bucket includes multiple chains. When a single instruction multiple data (SIMD) processor receives a group of threads configured to execute a key look-up instruction that accesses an element in the hash table, the threads executing on the SIMD processor identify a bucket that stores a key in the key look-up instruction. Once identified, the threads in the group traverse the multiple chains in the bucket, such that the elements at a chain level in the multiple chains are traversed in parallel. The traversal continues until a key look-up instruction succeeds or fails.

Another system and method for accessing a hash table are provided. A hash table includes buckets where each bucket includes a chain storing elements in multiple arrays. When a single instruction multiple data (SIMD) processor receives a group of threads configured to execute a key look-up instruction to access an element in the hash table, the threads executing on the SIMD processor identify a bucket that stores a key in the key look-up instruction. Once identified, the threads in the group traverse a chain in the identified bucket, such that the elements stored in an array are traversed in parallel. The traversal continues until a key look-up instruction succeeds or fails.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

FIGS. 1A-B are block diagrams of a hash table, according to an embodiment.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes"

and/or "including," when used herein, specify the presence of stated features, integers, steps, operations, elements, and/or components, but de not preclude the presence or addition of one or more other features, integers, steps, operations, elements, components, and/or groups thereof.

Folded Hash Tables

Figure 1A:
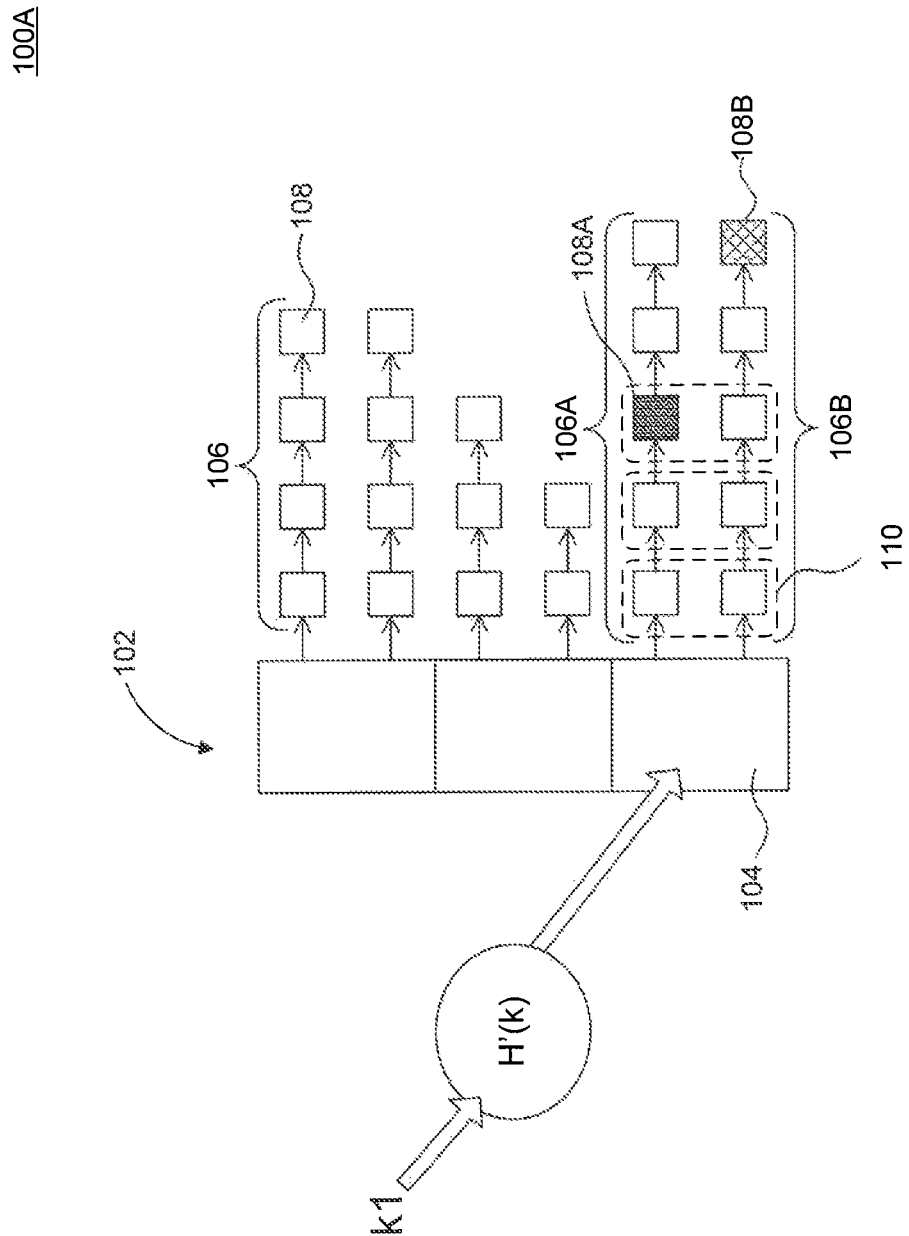
Figure 1B:
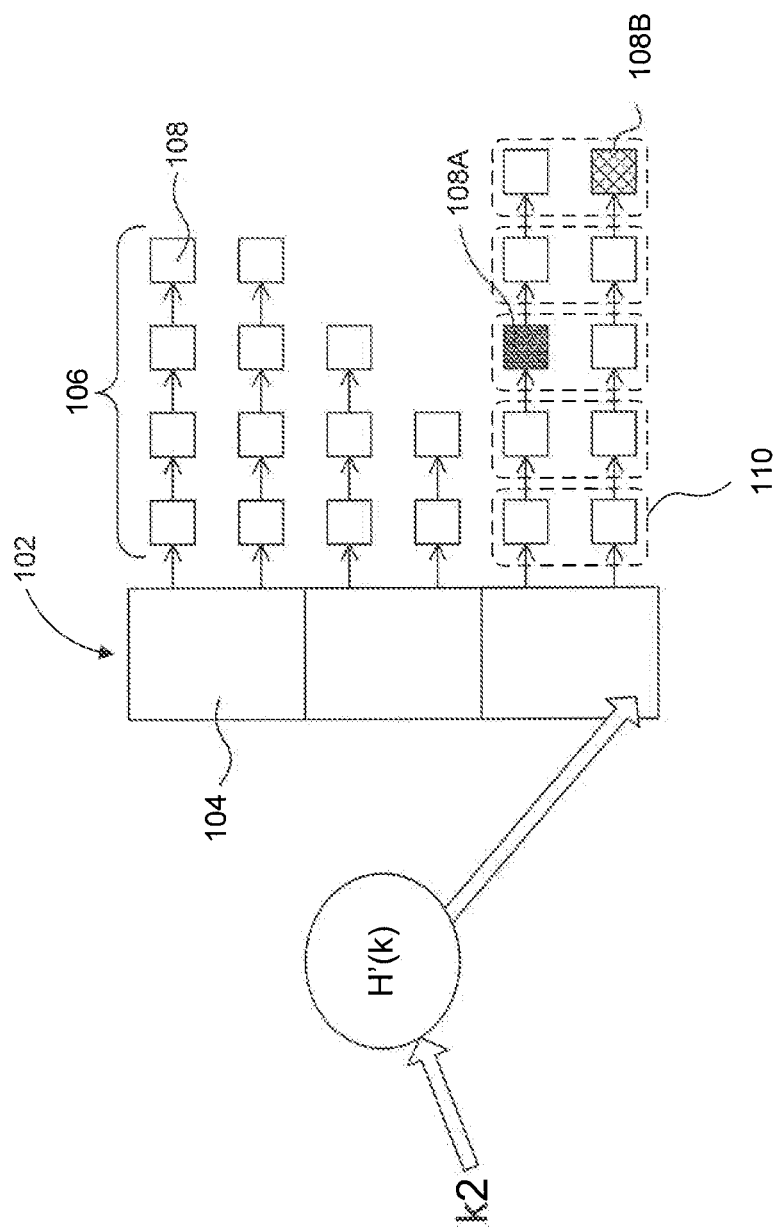

FIGS. 1A and 1B are block diagrams 100A and 100B of folded hash tables, according to an embodiment. Folded hash table, also referred to as hash table 102, stores multiple elements 108. Element 108 stores a value. A value may be an integer, a float, a character, a string, or any other defined, configured, or user-defined variable. Each value is associated with a key. A key may be translated to a bucket index by using a hash function algorithm known to a person of ordinary skill in the art, such as algorithm H'(k).

Threads (described below) look up elements stored in hash table 102 that are associated with keys. For example, a thread uses a key look-up method to look-up an element stored in hash table 102 that corresponds to a key. FIG. 1A shows a key look-up for an element associated in key k1. FIG. 1B shows a key look-up for an element associated with key k2. When a thread cannot find a key for an element, the thread determines that the element does not exist in hash table 102.

In an embodiment, hash table 102 includes buckets 104. When a hash function generates a bucket index, the key is assigned to that particular bucket 104. In an embodiment, keys in buckets 104 may be assigned according to a particular value range or other criteria specified in the hash function. The element (which includes key and value) is then stored as an element in the assigned bucket 104.

In an embodiment, hash table 102 enables intra-look-up parallelism through folding. To enable intra-look-up parallelism, elements 108 for keys in bucket 104 are stored in chains 106. Example chain 106 may be a linked list of elements 108, although, the implementation is not limited to this embodiment. Unlike conventional hash tables where each bucket holds a single linked list, buckets 104 have multiple chains 106. Example chains 106 are chain 106A and 106B in block diagram 100A. In an embodiment, the number of chains 106 may be defined or configured for each hash table 102.

Unlike conventional hash tables, chains 106 in hash table 102 are folded chains. To generate a folded chain, a chain in a conventional hash table is folded one or more times, such that it is represented by multiple chains 106. In an embodiment, multiple chains 106 are associated with a single bucket 104.

In an embodiment, a total number of chains 106 in bucket 104 is represented by a variable "F". To ensure chains 106 are of comparable length, hash table 102 may be configured such that each chain 106 holds 1/F number of elements 108 stored in bucket 104. Depth level 110 is referred to elements 108 in chains 106 that are at the same depth. For instance, first, second and third element in chains 106 in bucket 104 are at the same respective depth levels.

In an embodiment, hash tables 102 facilitate a key look-up on a single instruction, multiple data (SIMD) processor. A SIMD processor is the underlying core of graphics processing units (GPUs), accelerated processing units (APUs), general purpose graphics processing units (GPGPUs), and other processors that are adapted for parallel processing. In an embodiment, a SIMD processor may also be implemented on multiple control processing units (CPUs) that emulate parallel processing.

In an embodiment, SIMD processors may be suited for data-parallel, mathematically-intensive processing, such as graphics-intensive processing and matrix computations.

In SIMD processing, multiple processing elements execute concurrently, and with the same set of instructions. The instructions, however, process different sets of data. For instance, a SIMD processor may receive a unit of work called a work-group. Some or all work in the work-group may be performed in parallel. The work-group may be further sub-divided into multiple work-items, where each work-item is processed using its own thread. A person of ordinary skill in the art will appreciate that a thread includes a set of instructions that execute independently from other threads. Additionally, each thread has its own temporary memory space to access and store data.

A wavefront is a set of threads that execute in parallel using the same set of instructions (also referred to as a single instruction, multiple thread (SIMT) wavefront). A SIMT wavefront may include 32 or 64 threads, though the implementation is rot limited to these embodiments.

In a conventional hash table, branch divergence arises when threads receive an instruction to perform a key look-up. Because a key and a corresponding value of each key is different for each thread (i.e. because each thread processes a different set of data), the location of an element that stores the value in a hash table is also different. To find the value for the respective elements, threads traverse the hash table in lock step, where each thread looks up an element having the associated key. However, because elements for each key may be found in different depths of the hash-chains of the hash table, each thread in a SIMT wavefront may terminate after a different number of look-ups. This leads to branch divergence and reduced SIMT efficiency because threads that have completed their key look-ups successfully continue to perform look-up operations, with their results being masked out, until all threads in a SIMT wavefront either find the element associated with the key, or the look-up fails (i.e. a thread fails to find the element).

Unlike conventional hash tables, the chain folding in hash table 102 enables a single hash-table look-up that is parallelized for SIMD processing. For instance, a single look-up in hash table 102 uses a wide sweep search that does not diverge until the search completes for all threads in the wavefront. In an embodiment, the wide sweep search may be further optimized when a folding factor "F" equals the width of a SIMT wavefront.

In a wide sweep search, threads in the SIMT wavefront search for a key (such as k1 in FIG. 1A) by examining elements in chains 106 of a single bucket 104 in parallel until key k1 is found or the search for key k1 look-up fails. Chains 106 are examined in parallel when SIMT threads examine elements 108 from multiple chains 106 in bucket 104 that are at the same depth level 110 in lock step. Similarly, when searching for key k2 in FIG. 1B, threads examine chains 106 that are at the same depth level 110 in bucket 104 in parallel, until key k2 is found or the key k2 look-up fails.

Figure 2:
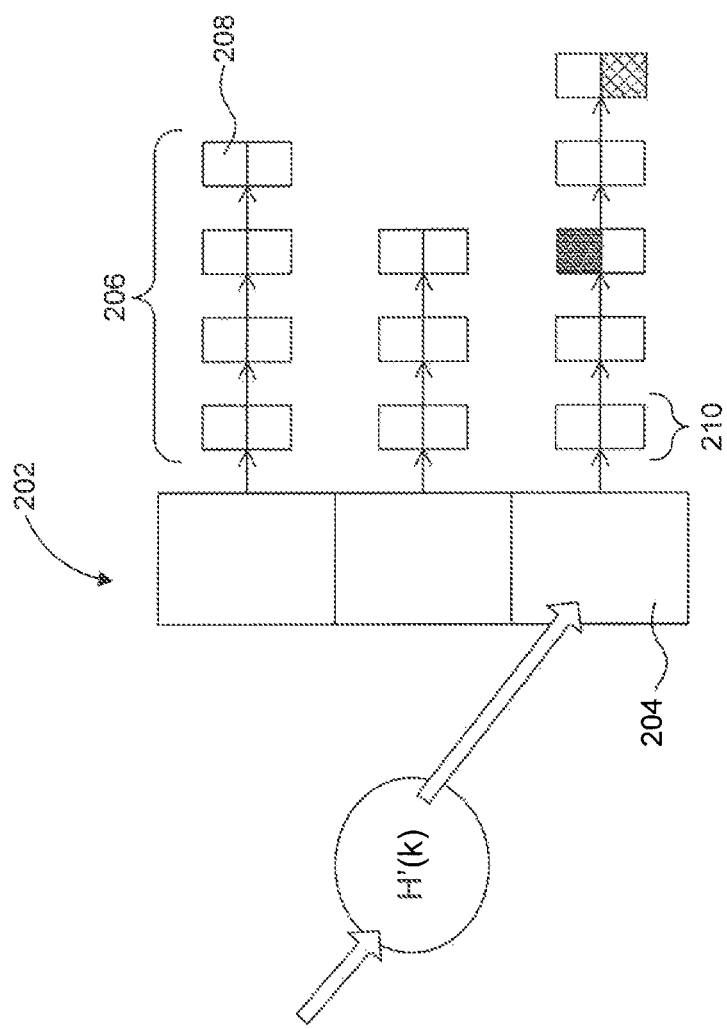
FIG. 2 is a bock diagram of a hash table, according to an embodiment.

FIG. 2 is a block diagram 200 of another folded hash table, according to an embodiment. FIG. 2 illustrates a hash table 202, buckets 204 and elements 208. Hash table 202 in FIG. 2 is an alternative implementation of hash table 102. In hash table 202, instead of having multiple chains 106 per bucket 104, elements 208 that would have been included in multiple chains 106 at the same depth level are organized in an F element wide array 210. Thus, bucket 204 includes a single chain 206, where chain 206 includes multiple F element wide arrays 210. In an embodiment, chain 206 includes one array 210 per depth level. A person skilled in the art will appreciate that array 210 may be implemented as a dynamic or static data structure.

Hash table 202 organization in FIG. 2 reduces branch and memory divergence. For instance, because elements 208 at the same depth level are organized as array 210, threads in a SIMT wavefront access a contiguous memory location at each step of the element search. Such contiguous accesses can occur in parallel in a GPGPU memory system.

In an embodiment, a pointer is used to point to a particular memory address in order to track the memory address in hash table 202. When elements 208 are stored in a contiguous array 210, threads in the SIMT wavefront may use a single pointer to point to hash table 202 and to the chained elements 208 in the array 210. This reduces a pointer overhead in hash table 202 by a factor of 1/F.

Additionally, because chains 206 are organized into array 210, a number of buckets 204 in hash table 202 as compared to hash table 102 is reduced by a factor of F.

Configuring Hash Tables

In an embodiment, a SIMD processor may be configured to determine whether to use a conventional hash table, hash table 102 or hash table 202 to store values in elements. For instance, in a conventional hash table, a number of buckets may be defined as $N_{old}$, and an average chain depth, such as an average number of elements in a chain, may be defined as $D_{old}$.

In an embodiment, a number of hash buckets 104 or 204 in a hash-table 102 and 202, respectively, may be referred to as the height of the hash table, and the average chain depth, may be referred to as a width of hash table 102 and 202. Although examples below are applied with reference to hash table 102, the examples are not limited to this embodiment, and may also be applied to hash table 202, and other hash tables.

In an embodiment, the width of the SIMT wavefront may be referred to as W.

In an embodiment, the minimum depth of elements 108 in chain 106 that can be profitably traversed by threads launched on SIMD processor is $Work_{min}$. A traversal is profitable, when the time and memory space tradeoff to traverse hash table 102 is superior to the traversal of a conventional hash table.

In an embodiment, hash tables may be squat hash tables and skinny hash tables. Squat tables include deep chains of elements that may be defined as $D_{old}/W > Work_{min}$. For squat tables, setting F=W and keeping $N_{new}=N_{old}$ may introduce a space/time tradeoff when a conventional hash table is configured as hash table 102. For example, the memory space for each hash bucket 104 may increase by a factor of W, because the memory space holds W head pointers, a pointer for each fold in chain 106. However, the increase in the memory space may be justified because the latency of a single look-up is reduced by a factor of W as each fold of the chain is $D_{new}=D_{old}/W$, and memory space overhead is minimal because hash table 102 is much wider than it is high.

Skinny hash tables are tables that include shallow chains of elements that may be defined as $D_{old}/W < Work_{min}$. For skinny hash tables, folding the chains without reducing a number of hash table buckets, reduces the depth of the folded chains beyond the point where a proportional performance improvement may be obtained. Therefore, to convert a conventional skinny hash table into hash table 102, a number of buckets in a conventional hash table may be reduced by a factor between 1 and W, such as a factor K, in a way that the chain depth exceeds $Work_{min}$. In an embodiment, K may be such that $N_{new}=N_{old}/K$ and $D_{new}K*D_{old}/W > Work_{min}$.

In an embodiment, where a folding factor F is such that F<W, a hybrid hash table may be generated. A hybrid hash table is a combination of a conventional hash table and hash table 102 or hash table 202. For instance, in a hybrid hash table where F=W/N, and N is an integer greater than zero, a SIMT wavefront covers N number of buckets 104 during a key look-up in the hybrid hash table. In other words, N lookups may be batched into a SIMT wavefront. For example, when N=2, then F=W/2, which means that two key look-ups may be batched into a single SIMT wavefront. In this instance, while a hybrid hash table design continues to rely on batching of key look-up instructions, the hybrid hash table design may reduce the number of instructions that may be batched during each SIMD kernel launch.

In an embodiment, multiple key look-up instructions whose keys are in the same bucket 104 in hash table 102 (or the same bucket 204 in hash table 202) may be combined in the same traversal. As a result, a single traversal of hash table 102 may satisfy multiple key look-up instructions. Referring back to FIG. 1A, bucket 104 stores elements 108A and 108B. When key look-up instructions for elements 108A and 108B are made, threads in a SIMT wavefront may identify both elements in a single traversal. For example, threads in the SIMT wavefront may traverse bucket 104 until threads identify element 108A, and then continue with the traversal until threads identify element 108B.

Methods for Accessing Folded Hash Tables

Figure 3:
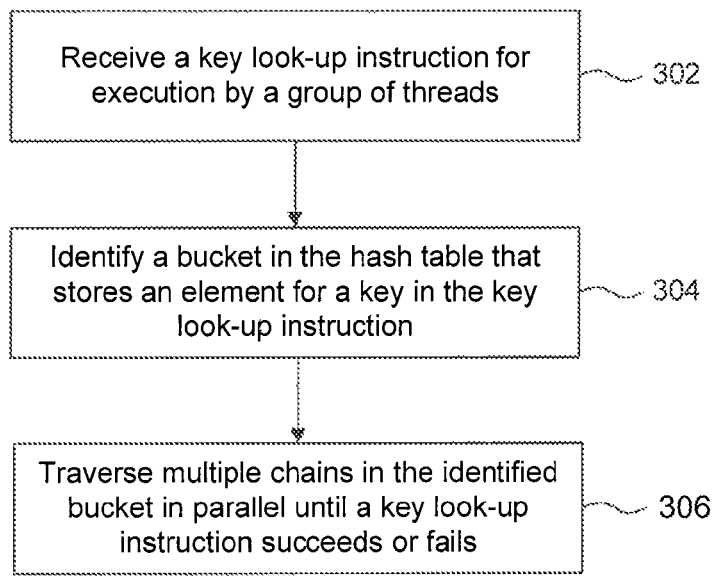
FIG. 3 is a flowchart of a method for accessing a hash table, according to an embodiment.

FIG. 3 is a flowchart of a method 300 for accessing a hash table, according to an embodiment. At operation 302, a key look-up instruction is received. For instance, a group of threads executing on a SIMD processor receives an instruction to look-up values stored in elements associated with keys that are stored in hash table 102.

At operation 304, a bucket is identified. For instance, for each key, threads in a SIMT wavefront identify bucket 104 that includes element 108. Element 108 stores a value for the key.

At operation 306, chains in a hash table are traversed. For instance, threads in a SIMT wavefront traverse chains 106 included in bucket 104. As discussed above, elements 108 in chains 106 that are at the same level 110 are traversed in parallel. The traversal continues until element 108 associated with the key is identified and the key look-up instruction succeeds, or element 108 is not found and the key look-up fails.

Figure 4:
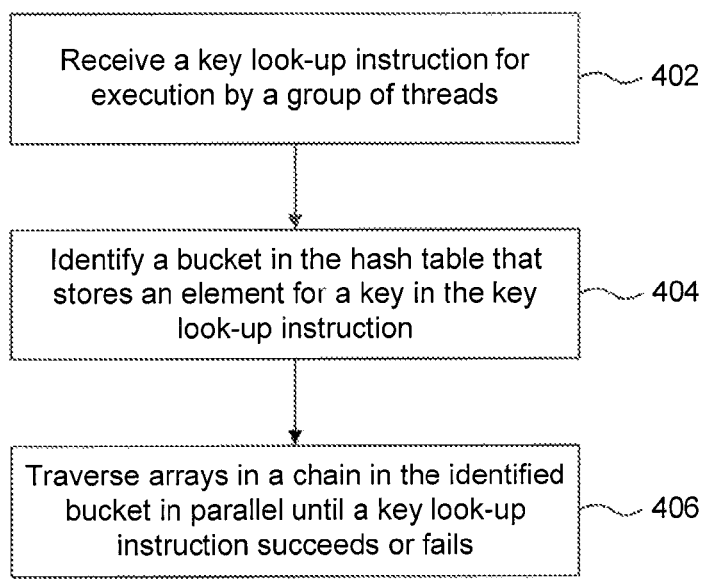
FIG. 4 is a flowchart of a method for accessing a hash table, according to an embodiment.

FIG. 4 is a flowchart of a method 400 for accessing a hash table, according to an embodiment. At operation 402, a key look-up instruction is received. For instance, a group of threads executing on a SIMD processor receives an instruction to look-up keys in hash table 202.

At operation 404, a bucket is identified. For instance, for each key, threads in a SIMT wavefront identify a bucket 204 that includes elements 208 that store a value for the key.

At operation 406, a bucket is traversed. As discussed above, in bucket 204 multiple elements 208 are arranged at each level in the chain 206 as element array 210. Elements 208 in element array 210 are accessed in parallel by the threads in the SIMT wavefront. The traversal continues until element 108 associated with the key is identified and the key look-up instruction succeeds, or element 108 is not found and the key look-up fails.

Example Computer System

Figure 5:
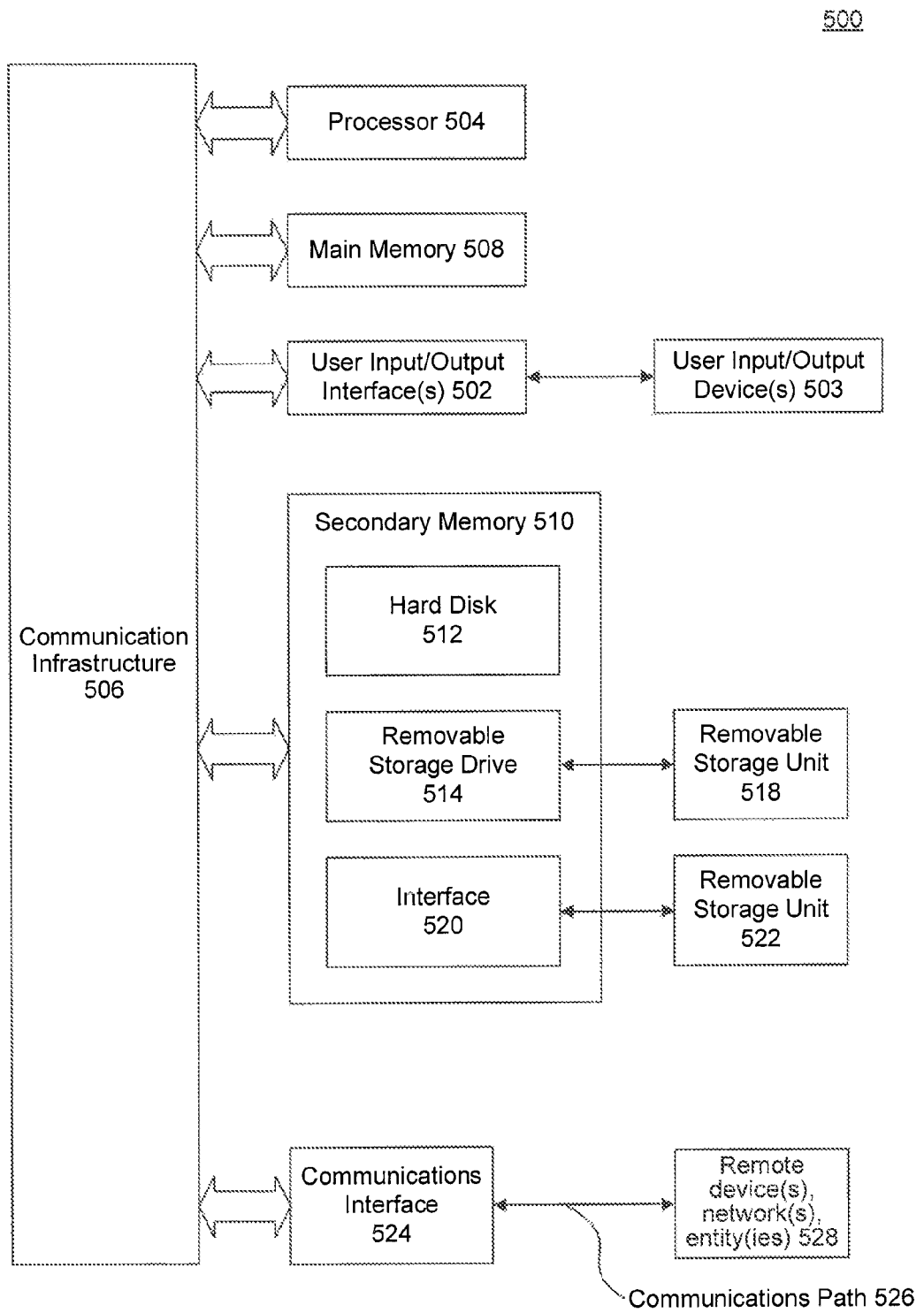
FIG. 5 is a block diagram of a computing environment where the embodiments may be implemented.

Various embodiments can be implemented, for example, using one or more well-known computer systems, such as computer system 500 shown in FIG. 5. Computer system 500 can be any well-known computer capable of performing the functions described herein.

Computer system 500 includes one or more processors Processor 504 is connected to a communication infrastructure or bus 506.

One or more processors 504 may be a graphics processing unit (GPU), control processing unit (CPU), general purpose graphics processing unit (GPGPU), advanced processing unit (APU), or another processor adept from SIMD processing.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data. In an embodiment main memory may be shared and accessed by multiple processors 504.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the disclosed embodiments using data processing devices, computer systems and/or computer architectures other than that shown in FIG. 5. In particular, embodiments may operate with software, hardware, and/or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the disclosure or the appended claims in any way.

While the disclosure has been detailed herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A system comprising:
a memory configured to store a hash table, wherein the hash table comprises a bucket including first and second chains storing elements, wherein the first and second chains in the bucket are folded to enable a single hash table look-up operation that is parallelized for single instruction multiple data (SIMD) processing; and a SIMD processor configured to:
fold the first and second chains in the hash table into folded chains, wherein a folded chain stores multiple chains and substantially same number of elements as other folded chains;
determine that the bucket stores an element associated with a key in a key look-up instruction; and
traverse elements in the first chain using a first thread in parallel with traversing elements in the second chain using a second thread in a wide sweep search until a key look-up instruction succeeds or fails, the first chain and the second chain being at the same depth level, wherein the first and second threads are associated with a group of threads configured to execute the key look-up instruction in parallel.

2. The system of claim 1, wherein the first and second threads execute in parallel as a single instruction multiple thread (SIMT) wavefront.

3. The system of claim 1, wherein the first chain is a linked list of elements.

4. The system of claim 1, wherein the SIMD processor is further configured to:
determine a second element in the bucket associated with a second key in a second key look-up instruction; and
after the key in the bucket is found, continue to traverse the first chain using the first thread in parallel with traversing the second chain using the second thread in search for the second key.

5. The system of claim 1, wherein the SIMD processor is further configured to fold chains in the hash table into folded chains according to a single instruction multiple thread (SIMT) wavelength.

6. A system comprising:
a memory configured to store a hash table, wherein the hash table comprises buckets each including a chain having multiple arrays, wherein the chain in the bucket is folded to enable a single hash table look-up operation that is parallelized for single instruction multiple data (SIMD) processing; and
a SIMD processor configured to:
fold the chains in the hash table;
determine a bucket in the hash table that stores an element in a chain associated with a key in a key look-up instruction, wherein the chain includes a first array at a first level and a second array at a second level; and
traverse elements in the first array at the first chain level using a first thread in parallel with traversing elements in the second array at the second chain level using a second thread in a wide sweep search until a key look-up instruction succeeds or fails, wherein the first and second threads are associated with a group of threads configured to execute the key look-up instruction in parallel.

7. The system of claim 6, wherein the SIMD processor is further configured to: traverse, using the first thread, the second array at the second chain level in parallel with the second thread traversing, the second array, when the traversal of the first array completes.

8. The system of claim 6, wherein the first and second threads execute in a single instruction multiple thread (SIMT) wavefront.

9. The system of claim 6, wherein the first array at the first chain level is linked to the second array at the second chain level as a linked list.

10. The system of claim 6, wherein the SIMD processor is further configured to:
determine a second element in the bucket associated with a second key in a second key look-up instruction; and
after the key in the bucket is found, continue to traverse, using the first thread an array in the chain in parallel with the second thread traversing the array in search for the second element.

11. The system of claim 6, wherein the SIMD processor is further configured to fold chains in the hash table according to a single instruction multiple thread (SIMT) wavelength.

12. A method comprising:
storing a hash table in memory, wherein the hash table comprises a bucket including first and second chains storing elements, wherein the first and second chains in the bucket are folded to enable a single hash table look-up operation that is parallelized for single instruction multiple data (SIMD) processing;
folding the first and second chains in the hash table into folded chains, wherein a folded chain stores multiple chains and substantially same number of elements as other folded chains;
determining, using a SIMD processor, a bucket stored in the hash table, wherein the bucket includes first and second chains and the bucket stores an element associated with a key in a key look-up instruction; and
traversing elements in the first chain using a first thread in parallel with traversing elements in the second chain using a second thread in a wide sweep search until a key look-up instruction succeeds or fails, the first chain and the second chain being at the same depth level, wherein the first and second threads are associated with a group of threads configured to execute the key look-up instruction in parallel.

13. The method of claim 12, wherein the first and second threads execute in a single instruction multiple thread (SIMT) wavefront.

14. The method of claim 12, wherein the first chain is a linked list of elements.

15. The method of claim 12, further comprising:
identifying a second key in a second key look-up instruction in the bucket; and after the key in the bucket is found, continuing to traverse the first chain using the first thread in parallel with traversing the second chain using the second thread in search for the second key.

16. The method of claim 12, further comprising folding chains in the hash table into folded chains according to a single instruction multiple thread (SIMT) wavelength.

* * * * *